Jan. 16, 1968    D. SCARAMUCCI    3,363,650
COMBINATION PLUG AND CHECK VALVE
Filed Oct. 14, 1963    4 Sheets-Sheet 1

INVENTOR.
DOMER SCARAMUCCI
BY
Dunlap & Laney
ATTORNEYS

Jan. 16, 1968   D. SCARAMUCCI   3,363,650
COMBINATION PLUG AND CHECK VALVE
Filed Oct. 14, 1963   4 Sheets-Sheet 2

INVENTOR.
DOMER SCARAMUCCI
BY
Dunlap & Laney
ATTORNEYS

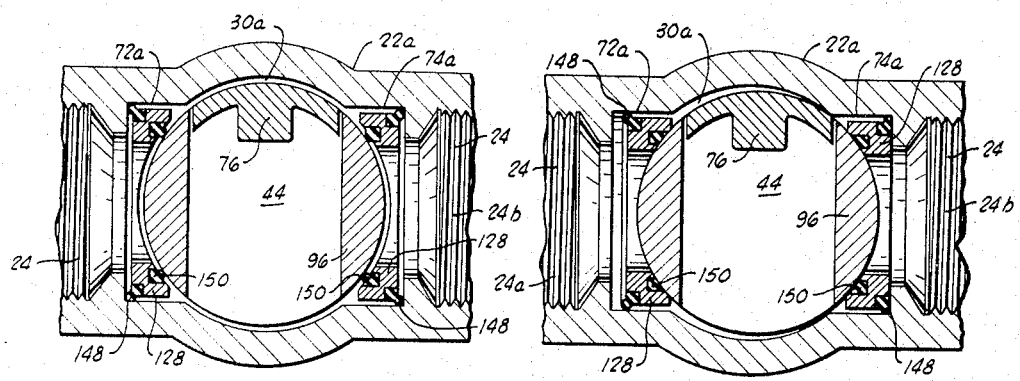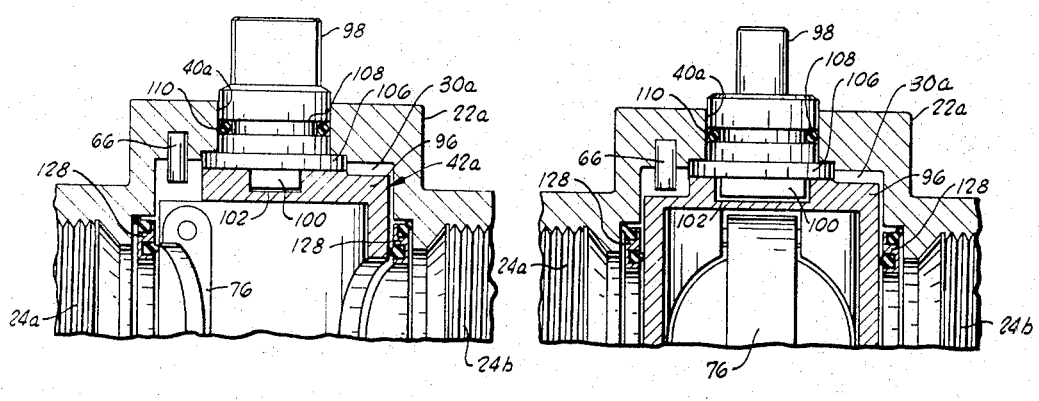

United States Patent Office 3,363,650
Patented Jan. 16, 1968

3,363,650
COMBINATION PLUG AND CHECK VALVE
Domer Scaramucci, P.O. Box 9125,
Oklahoma City, Okla.
Filed Oct. 14, 1963, Ser. No. 315,816
19 Claims. (Cl. 137—614.17)

This invention relates generally to improved valve mechanisms. More particularly, but not by way of limitation, this invention relates to an improved valve mechanism incorporating both the features of a plug valve and of a check valve.

Various types of combination valves have been constructed in the past. Most of these valves utilized a plug rotatably mounted in a valve housing and having some form of seal positioned between the housing and plug to prevent fluid from leaking through or around the plug. In this respect, they were virtually identical to the other plug valves on the market. The combination valves also included a check valve mechanism mounted within the plug. Such check valve mechanism was provided with its own seat and seal within the plug. Combining the two types of valves in this manner resulted in an extremely large combination valve in overall dimensions to provide a flow area comparable to that of a much smaller plug or check valve. One problem inherent in a construction utilizing a complete check valve within the plug is that the separate seals provided increase the chances of valve failure due to seal failure. Such a valve will necessarily be expensive to manufacture because, for all practical purposes, two complete valves must be machined and assembled.

Another type of combination valve that has been manufactured includes a check valve member pivoted in the body of the valve and a plug that is rotatably mounted in the body. The valve is constructed so that a portion of the plug seals against a flow passageway through the valve, while another portion of the plug is shaped to cooperate with the check valve member. When the plug is rotated to a position aligning the passageway through the valve, the check valve member is free to pivot on the valve body into the passageway in the plug. When the plug is rotated to close the passageway through the valve, the plug cams the check valve member into sealing engagement with the valve body.

A combination valve of the latter construction is an improvement over the type previously described in that the check valve operation and plug valve operation utilize the same sealing members and the possible flow area is greater in proportion to the overall dimensions of the valve. There are, however, several disadvantages inherent in a valve of the foregoing type. For example, should the check valve member become stuck in the open position or should an attempt be made to close against a relatively high pressure, i.e., with the check valve member extending into the plug, the valve cannot be shut off without damage to the plug and check valve member. Also, the valve body must be large enough to accommodate both the check valve and the plug valve. Temperature variations occurring when the valve is closed will affect the force with which the seal is formed. Cracks have been observed in the body of such valves and are believed to be caused by the forces exerted by thermal expansion of the metal when the valve is closed. In addition to the foregoing disadvantages, such a valve is expensive to manufacture due to the complex nature of the valve body and of the cam surfaces of the plug and check valve members.

It is therefore one object of the invention to provide an improved combination valve that has a flow area as large as a plug valve of comparable overall dimensions.

Another object of the invention is to provide an improved combination valve that utilizes the same sealing means when used as a plug or check valve.

Still another object of the present invention is to provide an improved combination valve wherein the check valve member cannot interfere with the operation of the plug valve.

An additional object of the invention is to provide an improved valve having a movable plug member.

Another object of the invention is to provide improved sealing means for forming a fluid-tight seal between a movable plug member and the valve body in which the plug is mounted.

Still another object of the invention is to provide an improved sealing means adapted to form a fluid-tight seal between the valve body and the plug operating member regardless of the position of the plug member in the valve body.

A further object of the invention is to provide an improved combination valve that can be easily and economically manufactured.

Generally stated, the foregoing objects are attained by an improved combination valve which includes: a valve body having a flow passageway therethrough and a chamber intersecting the passageway; a plug member rotatably mounted in the chamber and having a flow passage through the plug member, and a check valve member mounted for rotation with the plug member and pivotally positioned in the flow passage. The arrangement is such that the check valve member cooperates with the valve body when the flow passage in the plug is aligned with the passageway in the valve body to prevent flow in one direction while permitting flow in the other direction, and when the plug is turned to prevent flow in either direction the plug cooperates with the same seal structure as did the check valve.

The foregoing and additional objects and advantages of the invention will become more apparent as the following description is read in conjunction with the accompanying drawings wherein like reference characters denote like parts in all views and wherein:

FIG. 6 is a view of the upper portion of a combination valve, partly in elevation and partly in cross-section, illustrating an alternate arrangement of the plug and plug operating member;

FIG. 7 is a view similar to FIG. 6, but showing the plug and plug operating member rotated 90°;

FIG. 10 is a cross-sectional view taken in a horizontal plane illustrating one embodiment of a seal assembly located between the plug and valve body;

FIG. 11 is a view similar to FIG. 10, but showing the parts in the positions they occupy when pressure is applied to the valve in one direction;

Figure 1:
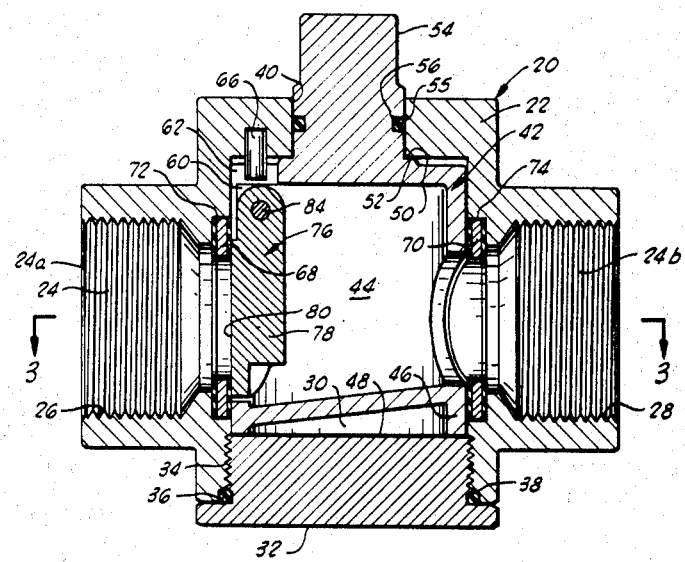
FIG. 1 is a cross-sectional view illustrating one embodiment of a combination plug and check valve constructed in accordance with the invention and showing the parts in position to operate as a check valve.

Referring to the drawings, and to FIG. 1 in particular, shown therein and generally designated by the reference character 20 is a combination valve. The combination valve 20 includes a valve body 22 having a flow passageway 24 extending horizontally therethrough with one end 24a of the passageway being considered the inlet and the other end 24b being considered the outlet. The valve body 22 is provided with suitable means for attaching the valve 20 between sections of conduit (not shown), such as the interior threads 26 and 28 in the inlet 24a and outlet 24b of the passageway 24. The valve body 22 also has an enlarged, vertically extending chamber 30 intersecting the passageway 24. For convenience in manufacturing and assembly, the lower end of the chamber 30 is left open and then closed upon assembly by a cover member 32 which is threaded, as at 34, or otherwise suitably secured in the valve body 22. An O-ring seal 36 is located in an annular groove 38 in the cover member 32 and serves to prevent leakage of fluid between the cover member 32 and valve body 22. An opening 40 extends through the top of the valve body 22 into the chamber 30 directly opposite to the cover member 32.

A cylindrical plug member 42, having a flow passageway 44 therethrough, is rotatably mounted in the chamber 30. The plug member 42 is prevented from moving downwardly in the chamber 30 by the engagement of a lower peripheral flange 46 with the upper surface 48 of the cover member 32, and is prevented from moving upwardly therein by the engagement of an upper surface 52 on the plug member 42 engaging the downwardly facing surface 50 on the valve body 22 around the opening 40. An operating stem portion 54 of the plug member 42 extends upwardly through the opening 40 and is provided with an O-ring member 55 located in a groove 56. The O-ring member 55 is provided to form a fluid-tight seal between the stem portion 54 and the valve body 22.

Figure 5:
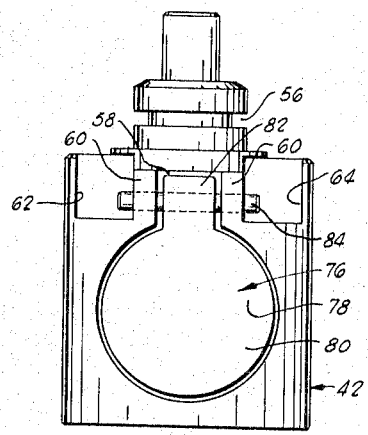
FIG. 5 is an elevational view of the plug and check valve members removed from the valve.
Figure 5A:
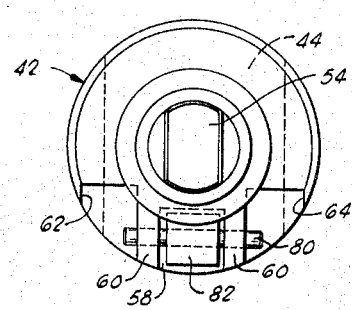
FIG. 5a is a plan view of the plug member of FIG. 5.

The plug member 42 (FIGS. 5 and 5a) has a slot 58 extending upwardly from one end of the flow passage 44. It is also provided with a pair of vertically extending lugs 60 defining the slot 58 and a pair of radially disposed stop portions 62 and 64 on opposite sides of the lugs 60. The lugs 60 are slightly lower in height than the stop portions 62 and 64 so that a stop pin 66 (FIGS. 1 and 2) mounted in the valve body 22 can alternately engage the stop portions 62 and 64 as the plug member 42 is rotated, but can pass over the lugs 60. The circumferential displacement of the stop portions 62 and 64 is such that the plug member 42 can be rotated approximately 90° from a position wherein the stop pin 66 engages the stop portion 64. Stated in a different manner, the relationship between the stop pin 66 and the stop portions 62 and 64 is such that when the pin 66 engages the stop portion 62, the passage 44 and passageway 24 are aligned, and when the stop pin 66 is against the stop portion 64, the passage 44 is 90° out of alignment with the passageway 24.

Figure 13:
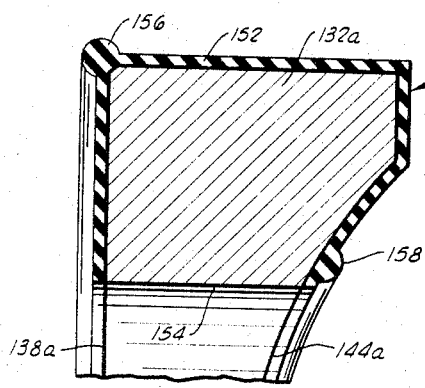
FIGS. 13 and 14 are enlarged cross-sectional views of alternate forms of seals that can be used as illustrated in FIG. 10; and, FIG. 15 is a view similar to FIG. 5, but illustrating an alternate method of pivoting the check valve member on the plug.
Figure 12:
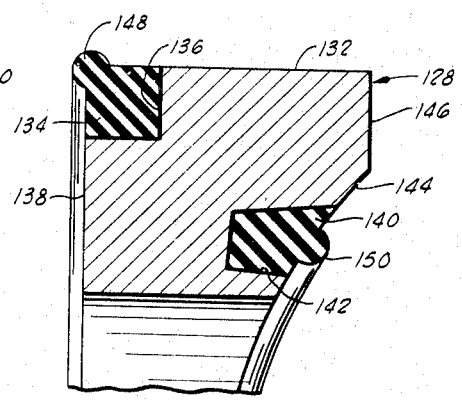
FIG. 12 is an enlarged cross-sectional view of the seal use in FIG. 10.
Figure 14:
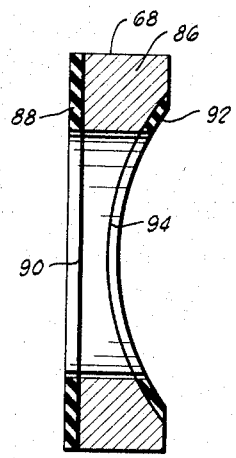

If desired, the dimensions of the chamber 30 and the plug member 42 may be very close to the same value so that no separate sealing member is required to form a fluid-tight seal between the plug member 42 and valve body 22. However, due to the expense incurred in attempting to hold such close dimensions, the preferred form of the invention includes a pair of sealing members 68 and 70 disposed in annular grooves 72 and 74, respectively, formed coaxially with the passageway 24 in the valve body 22. Where the valve 20 is to be used to hold relatively low pressures, the sealing members 68 and 70 may be formed from a resilient material such as rubber, Buna-N, or neoprene. If the pressures encountered are relatively high, the sealing members may be reinforced and have a configuration such as shown in FIGS. 12, 13, or 14, and as will be described below.

A check valve member, generally designated by reference character 76, has a body portion 78 of a size to be received in the passage 44 and has a curved surface 80 conforming to the exterior configuration of the plug member 42. A tongue-like portion 82 (FIG. 5) extends upwardly from the body portion 78 into the slot 58 between the lugs 60. A pivot pin 84 passes through the lugs 60 and the tongue-like portion 82, pivotally suspending the check valve member 76 in the passage 44. It should be pointed out that the passage 44 is enlarged, relative to the size of the passageway 24, so that the body portion 78 of the check valve member 76 can be pivoted about the pin 84 into a position wherein the check valve member 76 is completely clear of the path of flow through the plug member 42. As described, the body portion 78 hangs freely in the passage 44 in the plug member 42 and has a surface 80 conforming to the shape of the plug member 42 and coterminous therewith. The surface 80 is provided to engage the sealing member 68 when the passage 44 is aligned with the passageway 24 in the valve body 22 to prevent flow in one direction through the valve 20 as will be described.

When the plug member 42 fits into the valve body 22 very closely, such as in the embodiment shown in FIG. 1, the plug member 42 is subject to a very slight cocking. Therefore, the sealing members 68 and 70 need have only enough resiliency to compensate therefor. The sealing member 68 or 70 which may be used in the embodiment of FIG. 1, is illustrated in detail in FIG. 14. The seal 68 includes an annular reinforcing ring member 86 having a resilient material 88 bonded to one end surface 90 and having a resilient material 92 bonded to the opposite end surface 94. The end surface 90 mates with the end of the respective recess 72 or 74 in the valve body 22 and the surface 94 conforms to the exterior configuration of the plug member 42. As shown, the resilient materials 88 and 92 are relatively thin, but are of sufficient thickness to provide the required resiliency.

Figure 2:
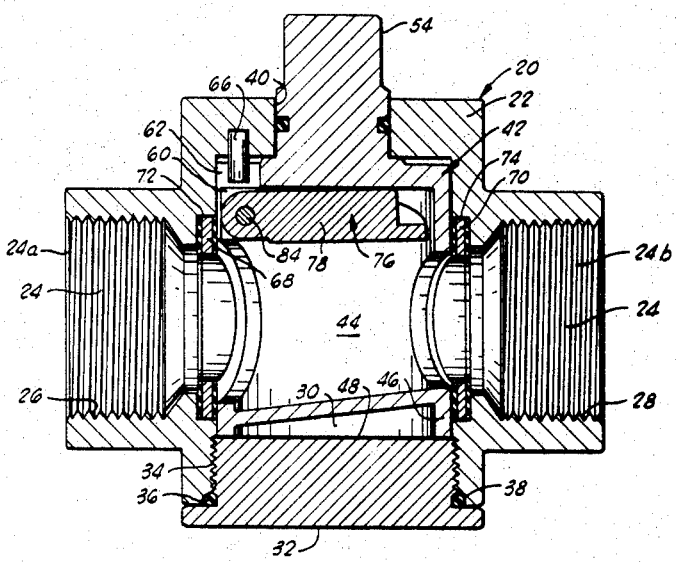
FIG. 2 is a cross-sectional view similar to FIG. 1, but showing the check valve member in the open position.
Figure 3:
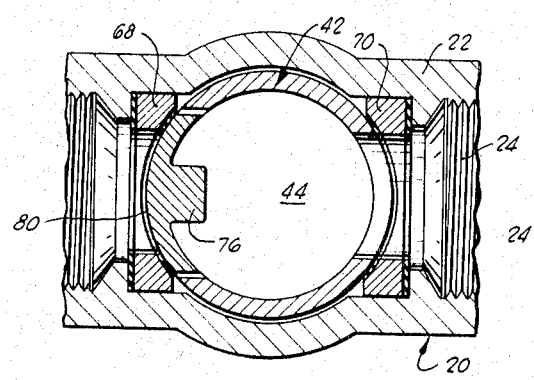
FIG. 3 is a cross-sectional view taken along the line 3—3 of FIG. 1.

In the position of the plug member 42, illustrated in FIGS. 1, 2 and 3, the valve 20 has the passageway 24 in the valve body 22 aligned with the passage 44 in the plug member 42 in order that the valve may function as a check valve. With the parts in this position, fluids can flow from left to right through the valve 20 because the check valve member 76 will be pivoted about the pin 84 into the position shown in FIG. 2. In this position, check valve member 76 is completely clear of the flow path through the valve 20 and is contained entirely within the plug member 42.

Should the fluid attempt to flow from right to left through the valve 20, the check valve member 76 pivots downwardly until the surface 80 thereon contacts the sealing member 68 in the valve body 22, forming a fluid-tight seal with the member 68 and preventing the reverse fluid flow.

Figure 4:
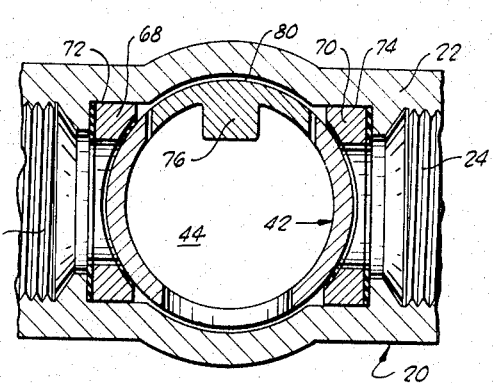
FIG. 4 is a cross-sectional view similar to FIG. 3, but showing the plug rotated 90°.

As previously described, the surface 80 on the check valve member 76 conforms to the exterior configuration of the plug member 42 and the surface 94 (FIG. 14) of the sealing member 68 likewise conforms. The conformity of the check valve member 76, the plug member 42, and the sealing member 68 permits the rotation of the plug member 42 in the valve body 22 regardless of the pressure condition existing in the valve 20. FIG. 4 clearly illustrates the position of the plug member 42 and the check valve member 76 with respect to the sealing members 68 and 70 after rotation of the plug member 42 to a position wherein passageway 24 and the passage 44 are 90° out of alignment. As shown therein, a fluid-tight seal between the plug member 42 and the valve body 22 is attained by the sealing members 68 and 70.

FIGS. 6 and 7 illustrate a modified form of plug member 42a that can be used in a combination plug and check valve. In this version, a plug body 96 operates in conjunction with a plug operating member 98 that is separate from the plug body 96. The plug operating member 98 has a rectangular lug 100 formed on its lower end which is engageable with a rectangular recess 102 formed in the upper end of the plug body 96. The recess 102 is dimensionally larger (see FIG. 7) than the lug 100 so that the plug body 96 can shift or move in the direction of the axis of the flow passageway 24 in a slightly modified valve body 22a as pressure is applied to the valve. Also, of course, in this form of the invention, the plug body 96 is smaller in diameter than the cooperating valve chamber in order for the plug body to be able to shift as described. The ability of the plug body 96 to shift reduces the possibility of the plug body 96 cocking in the chamber 30a and sticking or binding, thereby decreasing the force required to operate the valve.

The plug operating member 98 is retained in the valve body 22a by an outwardly extending radial flange 106 located on the plug operating member 98. The flange 106 is larger in diameter than the opening 40a so that it cannot pass therethrough. The plug operating member 98 is provided with a groove 108 and has an O-ring member 110 disposed in the groove 108. The O-ring member 110 is arranged to form a seal with the valve body 22a, as did the O-ring 55 in the embodiment shown in FIG. 1. In all other respects, the plug member 42a is the same as the plug member 42 previously described. The plug body 96 can move without cocking and binding in the valve body 22a due to the difference in size of the rectangular recess 102 in the plug body 96 and the size of the rectangular lug 100 on the plug operating member 98 as shown in FIG. 7.

Figure 8:
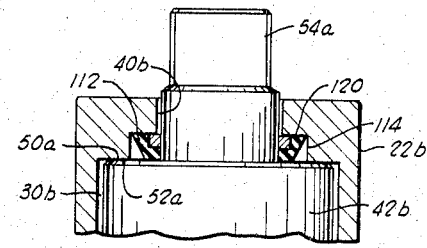
FIG. 8 is a view similar to FIG. 6, but showing a plug having an integral stem and a sealing structure therefor.

Another form of combination plug and check valve, which also permits the movement of the plug member in the valve body, is shown in FIG. 8. As illustrated therein, the plug member 42b is rotatably mounted in the chamber 30b of the valve body 22b and has an operating stem portion 54a extending upwardly through the opening 40b. In this arrangement, the size of the opening 40b is increased in relation to the size of the operating stem portion 54a, thus permitting the entire plug member 42b to shift as pressure is applied on the plug member. Upward movement of the plug member 42b is prevented by the engagement of an upper surface 50a with a downwardly facing surface 52a in the valve body 22b. As previously pointed out, the plug member 42b of FIG. 8 can move without cocking or binding due to the opening 40b being constructed larger than the stem portion 54a extending therethrough.

Figure 9:
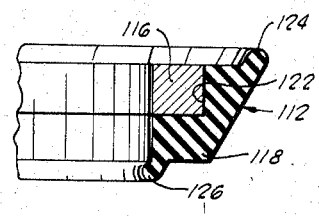
FIG. 9 is an enlarged, cross-sectional view of the sealing structure of FIG. 8.

A fluid-tight seal between the plug member 42b and the valve body 22b, preventing leakage around the stem portion 54a, is attained by a seal assembly 112. The seal assembly 112 encircles the stem portion 54a and is positioned in a counterbore 114 formed coaxially with the opening 40b in the valve body 22b. The seal assembly 112, which can be more clearly seen in FIG. 9, includes a reinforcing ring member 116 and a resilient ring member 118. If desired, the members 116 and 118 can be bonded together. The reinforcing member 116 closely encircles the stem portion 54a and has an outside diameter less than the diameter of the counterbore 114, but sufficiently large to remain in contact with the upper end 120 of the counterbore 114 in any position of the plug member 42b. The resilient member 118 has an annular recess 142 in which the reinforcing member 116 is disposed. A circumferential bead 124 extends upwardly from the outer periphery of the resilient member 118 and terminates above the reinforcing member 116. A second circumferential bead 126 extends downwardly and inwardly from the lower end of the resilient member 118 and is adapted to sealingly engage the stem portion 54a and the upper surface 50a of the plug member 42b. The bead 124 is adapted to engage the downwardly facing surface 120 formed by the upper end of the counterbore 114, thereby completing the seal between the stem portion 54a and the valve body 22b. Fluid pressure, which may be applied against the seal assembly 112 in attempting to pass through the opening 40b, serves to augment the already effective seal formed by the seal assembly 112 by further deforming the pressure responsive circumferential beads 124 and 126 against the upper end 120 of the counterbore 114 and against the stem portion 54a, respectively.

When an embodiment of a combination plug and check valve such as shown in FIG. 6 or FIG. 8 is used, wherein the plug member is intentionally permitted to shift in the valve body, the seal member provided must be able to maintain a fluid-tight seal in any position of the plug member. The seal 128 shown in detail in FIG. 12, and the seal 130 shown in detail in FIG. 13, are examples of the construction of seals that can be satisfactorily used in such shifting-plug member embodiments. The seal 128 includes a reinforcing member 132 which is generally shaped like an annular ring; an annular resilient member 134 located in a circumferential groove 136 formed in the outer end 138 of the reinforcing member 132, and an annular resilient member 140 located in the groove 142. The groove 142 is formed in a surface 144 at the inner end 146 of the reinforcing member 132, which surface 144 conforms to the external configuration of the plug with which it is to be used. A bead 148 extends upwardly and outwardly from the resilient member 134 and a bead 150 extends outwardly from the resilient member 140. The purpose of the beads 148 and 150 will be described hereinafter.

The seal 130 is similar in external shape to the seal 128, but comprises a resilient sheath or cover 152 encasing an annular reinforcing ring member 132a. The ring member 132a has a flat outer end 138a and a curved surface 144a on its inner end in a manner similar to the end 138 and surface 144 of the ring member 132. As illustrated in FIG. 13, the sheath 152 does not extend over the inner periphery 154 of the member 132a, but, if desired, the entire exterior of the reinforcing member 132a could be encased. The cover 152 is provided with a bead 156, which is comparable in shape and purpose to the bead 148 on the seal 128, and a bead 158, which is comparable in shape and purpose to the bead 150.

FIGS. 10 and 11 have been included in the drawings for the purpose of illustrating the operation of seals, such as 128 or 130, when used in conjunction with movable plugs, such as the plug member 42b or the plug body 96, which are shown in FIGS. 8 and 6, respectively. In order to simplify the description of FIGS. 10 and 11, the plug body shown therein will be referred to by the reference numeral 96. Other referenced items illustrated include the valve body 22a, the passageway 24, the passage 44 in the plug body 96, a chamber 30a in the valve body 22a, and annular grooves 72a and 74a in which the seals 128 are located.

The movable plug type valve as exemplified by the embodiment illustrated in FIGS. 6 and 8, operates in essentially the same way as the embodiment of FIG. 1. The primary difference is the manner in which a seal is maintained between the plug member 42b or the plug body 96 and the valve body 22. FIG. 10 illustrates the position of the seals 128 and the plug body 96 when the plug body has little or no differential pressure across the plug body. As shown therein, the beads 148 are in sealing relationship with the valve body 22a and the annular grooves 72a and 74a. The beads 150 are relatively undeformed and are in sealing relationship with the plug body 96. It should be noted that with little or no differential pressure across the plug body 96, it is retained in the center of the chamber 30a by the seals 128.

FIG. 11 illustrates the positions of the various parts of the valve when a relatively high differential pressure has been applied from left to right across the plug body 96. As shown therein, the plug body 96 has been moved to the right by the force resulting from the differential pressure. The seal 128 on the right-hand or low pressure side of the plug body 96 has been moved to the right, deforming the beads 148 and 150 and thereby enhancing the seal which they form with the annular groove 74a in the valve body 22a and the plug body 96, respectively. The seal 128 on the left-hand or high pressure side of the plug body 96 has also been moved to the right. The movement of the left-hand seal 128 occurs due to the seal formed by the bead 150 against the plug body 96 and due to the seal formed by the bead 148 with the annular groove 72a in the valve body 22a. It should be pointed out that the bead 148 responds to pressure applied and is deformed against the valve body 22a as the seal 128 moves to the right following the plug body 96. The seals 128 will cooperate with the plug body 96 and the valve body 22a to form a fluid-tight seal therebetween regardless of the direction or distance that the plug body 96 moves relative to the valve body 22a. Furthermore, an increase in pressure in the inlet 24a merely further deforms and augments the seal provided by the beads 148 and 150.

One other advantage gained by the use of pressure responsive beads, such as 148 and 156, is that should fluid under pressure in the chamber 30a become greater than the highest pressure in the inlet 24a, the beads 148 and 156 on the left-hand seal 128 will permit the escape of such fluid into the inlet 24a. Should the pressure responsive bead 148 become wedged between the reinforcing member 132 and the valve body 22a, the seal 128 would perform similarly to a piston in a cylinder; i.e., the pressure within the chamber 30a would act on the portion of the seal 128 between the beads 148 and 150 and drive the seal 128 to the left until the bead 150 separates from the plug body 96, releasing the pressure in the chamber 30a.

Figure 15:
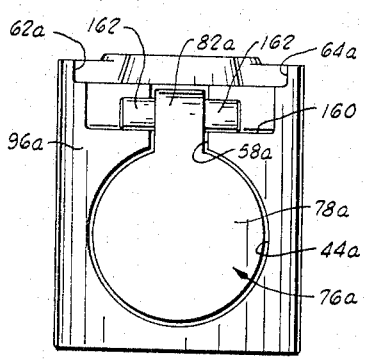

FIG. 15 illustrates an alternate construction for supporting a check valve member 76a on a plug body 96a. The check valve member 76a has a tongue-like portion 82a extending upwardly through a slot 58a formed in the plug body 96a at one end of the flow passage through the plug body. The plug body 96a has an upwardly facing surface 160 formed on the outer periphery thereof intersecting the slot 58a. The tongue-like portion 82a extends past the upwardly facing surface 160 and has a pair of pivot lugs 162 extending horizontally therefrom and resting on the upwardly facing surface 160. The lugs 162 could be replaced by a suitable pin inserted in the tongue-like portion 82a, if desired. The arrangement is such that the check valve member 76a is pivotally retained when the plug body 96a is assembled with the valve body 22 so that the check valve body portion 78a is operably located in the passageway 24. While the foregoing modification has been described in connection with the plug body 96a, it should be apparent that such method of pivotally mounting the check valve member 76a is equally applicable to any of the plug members shown or described.

It should be apparent from the foregoing description that apparatus constructed in accordance with the invention presents a novel valve combining the features of a plug and check valve. It should also be apparent that many of the novel features disclosed herein are equally applicable to a plug valve alone.

The combination valve disclosed herein is relatively simple in construction and can be economically manufactured. Such a combination can be utilized without fear of valve failure due to sticking of the plug as a result of differential pressure, and without fear that the check valve may stick in such a position as to prevent rotation of the plug member. A valve constructed in accordance with the invention also provides a combination check and plug valve wherein the fluid passageway through the valve is comparable to that of a plug valve of equivalent overall dimensions.

It should be understood that the embodiments described herein are presented by way of example only, and that many changes and modifications can be made therein without departing from the spirit of the invention or from the scope of the annexed claims.

What I claim is:
1. A combination valve including:
   a valve body having a flow passageway therethrough and having a chamber intersecting the flow passageway;
   a plug member rotatably mounted in the chamber and having a flow passage through said plug member;
   sealing means encircling said flow passageway within said chamber and adapted to cooperate with said plug member and valve body to form a fluid-tight seal therebetween; and,
   a check valve member mounted for rotation with said plug member and pivotally positioned on said plug member and extending into said flow passage, said check valve member being cooperable with said sealing means when said passage is aligned with said passageway to prevent flow through said valve in one direction while permitting flow therethrough in the opposite direction.

2. The combination valve of claim 1, wherein said flow passage is enlarged relative to said passageway whereby when said check valve member is pivoted upwardly therein, said flow passage has a cross-sectional area at least equal to the cross-sectional area of said passageway.

3. The combination valve of claim 1, wherein said valve body has a pair of annular grooves formed in the body within said chamber coaxially with said passageway; and wherein said sealing means includes a resilient sealing member disposed in each annular groove.

4. The combination valve of claim 1, wherein said plug member has a slot therein extending upwardly from a portion of said flow passage, and a pin extending across said slot anchored to the plug member; and wherein said check valve member is pivotally mounted on said pin.

5. The combination valve of claim 1, wherein said plug member has a slot therein extending upwardly from a portion of said flow passageway, and has upwardly facing surfaces thereon adjacent the top of said slot; and wherein said check valve member includes a tongue-like portion extending upwardly through said slot and having lug members thereon resting on said upwardly facing surfaces of said plug member.

6. A combination valve including:
   a valve body having a flow passageway therethrough and having a chamber intersecting the flow passageway;
   a plug member rotatably mounted in the chamber and having a flow passage through said plug member;
   a plug operating member extending into the chamber and having a lower end portion engageable with said plug member, said plug operating member having a radially extending flange portion engageable with said valve body whereby said plug operating member is retained therein;
   sealing means encircling said flow passageway within said chamber and adapted to cooperate with said plug member and valve body to form a fluid-tight seal therebetween; and,
   a check valve member mounted for rotation with said plug member and pivotally positioned on said plug member and extending into said flow passage, said check valve member being cooperable with said sealing means when said passage is aligned with said passageway to prevent flow through said valve in one direction while permitting flow therethrough in the opposite direction.

7. A combination valve including:
   a valve body having a flow passageway therethrough and having a chamber intersecting the flow passageway, said valve body also having a transverse opening extending into said chamber;
   a plug member rotatably mounted in the chamber and having a flow passage therethrough, said plug member also having an operating stem portion extending loosely through said opening whereby said plug member is movable in said chamber along the axis of said flow passageway;

stem sealing means encircling said stem portion within said chamber and forming a fluid-tight seal with said stem portion and valve body while permitting said movement of said plug member in said chamber;

sealing means encircling said flow passageway within said chamber and adapted to cooperate with said plug member and valve body to form a fluid-tight seal therebetween; and, a check valve member mounted for rotation with said plug member and pivotally positioned on said plug member and extending into said flow passage, said check valve member being cooperable with said sealing means when said passage is aligned with said passageway to prevent flow through said valve in one direction while permitting flow therethrough in the opposite direction.

8. The combination valve of claim 7, wherein said stem sealing means includes:
  a reinforcing member closely encircling said stem portion and having an outside diameter larger than said opening whereby said reinforcing member extends across said opening in all operating positions of said plug member; and,
  a resilient member cooperable with said reinforcing member and sealingly encircling said stem portion, said resilient member having an upwardly extending bead portion thereon sealingly engaging said valve body.

9. The combination valve of claim 7, wherein said valve body has a pair of annular grooves formed in the valve body on opposite sides of the chamber coaxially with said passageway; and wherein said healing means includes:
  an annular reinforcing member positioned in each of said grooves;
  a resilient member mounted in and encircling said annular reinforcing member in sealing engagement with said valve body; and,
  a second resilient member mounted in and encircling said annular reinforcing member and adapted to sealably engage said plug member.

10. The combination valve of claim 7, wherein said valve body has a pair of annular grooves formed in the valve body on opposite sides of the chamber coaxially with said passageway, and wherein said sealing means includes:
  an annular reinforcing member positioned in each of said grooves and having an inner surface and an outer peripheral surface; and,
  resilient means encasing said annular member and having a circumferential bead portion adjacent said peripheral surface engaging said valve body and having an annular bead portion thereon adapted to sealingly engage said plug member.

11. A combination valve including:
  a valve body having a flow passageway therethrough and having a chamber intersecting the flow passageway, said valve body also having a pair of annular grooves formed therein within the chamber coaxially with said passageway;
  a plug member rotatably mounted in the chamber and having a flow passage therethrough, said plug member having a slot extending upwardly from a portion of said passage and having an upwardly facing surface formed thereon adjacent the top of said slot;
  sealing means disposed in said annular grooves including an annular reinforcing member, a resilient member mounted in and encircling said reinforcing member in sealing engagement with said valve body, and a second resilient member mounted in and encircling said reinforcing member and adapted to sealably engage said plug member;
  a check valve member mounted for rotation with said plug member and having a tongue-like portion extending upwardly through said slot, the upper end of said tongue-like portion extending from said slot and having lug members thereon resting on the upwardly facing surface of said plug member whereby said check valve member is pivotally positioned on said plug member and extends into said passage, said check valve member being cooperable with one of said sealing means when said passage is aligned with said passageway to prevent flow in one direction through said valve while permitting flow in the opposite direction;
  a plug operating member extending into the chamber and having a lower end portion engageable with said plug member, said plug operating member having a radially extending flange portion engageable with said valve body whereby said operating member is retained therein; and,
  seal means encircling said plug operating member and engageable with said valve body whereby a seal is formed between said valve body and plug operating member.

12. In a combination valve including a valve body having a flow passageway extending therethrough, a chamber intersecting the flow passageway, and sealing means within said chamber and coaxial with said flow passageway, the improvement comprising:
  a plug member rotatably positioned within the chamber and having a flow passage extending through said plug member; and,
  a check valve member mounted for rotation with said plug member and pivotally positioned on said plug member and extending into said flow passage, said check valve member being cooperable with said sealing means when said passage is aligned with the flow passageway to prevent flow in one direction through said valve while permitting flow in the opposite direction.

13. In a combination valve including a valve body having a flow passageway extending therethrough, a chamber intersecting the flow passageway, and a pair of annular grooves formed in the chamber coaxially with the flow passageway, the improvement comprising:
  a plug member rotatably positioned within the chamber and having a flow passage extending through said plug member;
  sealing means including an annular reinforcing member positioned in each of said grooves, a resilient member mounted in and encircling said reinforcing member in sealing engagement with said valve body, and a second resilient member mounted in and encircling said reinforcing member adapted to sealingly engage said plug member; and,
  a check valve member mounted for rotation with said plug member and pivotally positioned on said plug member and extending into said passage, said check valve member being cooperable with said sealing means when said passage is aligned with the passageway to prevent flow through the valve in one direction while permitting flow in the opposite direction.

14. A combination valve including:
  a valve body having a flow passageway therethrough and having a chamber intersecting the flow passageway, said valve body also having a pair of annular grooves formed in said body within said chamber and coaxially with said flow passageway, and a transverse opening extending into said chamber;
  a plug member rotatably mounted in the chamber and having a flow passage therethrough;
  an operating stem portion on said plug member extending loosely through said transverse opening whereby said plug member is movable in said chamber along the axis of the flow passageway;

spaced-apart lug means on said plug member, said lug means and plug member defining a slot extending upwardly from a portion of said passage;

a check valve member mounted for rotation with said plug member and having a tongue-like portion extending upwardly through said slot, and a body portion located in said passage;

pin means extending through said lug means and said tongue-like portion whereby said check valve member is pivotally mounted on said plug member;

stem sealing means including a reinforcing member closely encircling said stem portion and having an outside diameter larger than said opening whereby said reinforcing member extends across said opening in all operating positions of said plug member, and a resilient member cooperable with said reinforcing member and sealingly engaging said stem portion, said resilient member having an upwardly extending bead portion thereon sealingly engaging said valve body; and, sealing means encircling said flow passageway within said chamber including an annular reinforcing member positioned in each of said grooves, a resilient member mounted in and encircling said annular reinforcing member in sealing engagement with said valve body, and a second resilient member mounted in and encircling said annular reinforcing member and adapted to sealingly engage said plug member, the arrangement and construction being such that said check valve member cooperates with said sealing means when said passage is aligned with said passageway to prevent flow through said valve in one direction while permitting flow therethrough in the opposite direction.

15. A combination valve including:

a valve body having a flow passageway therethrough and having a chamber intersecting the flow passageway, said valve body also having a pair of annular grooves formed in said body within said chamber and coaxially with said flow passageway, and a transverse opening extending into said chamber;

a plug member rotatably mounted in the chamber and having a flow passage therethrough, a rectangular recess therein, a slot extending upwardly from said passage, and an upwardly facing surface thereon adjacent the upper end of said slot;

a plug operating member extending into said chamber and having a rectangular end portion loosely fitting into said rectangular recess, and a radially extending flange portion engageable with said valve body to retain said plug operating member therein;

stem sealing means encircling said plug operating member and engageable with said valve body whereby a fluid-tight seal is formed between said plug operating member and said valve body;

sealing means encircling said flow passageway disposed within said annular grooves and adapted to cooperate with said plug member and valve body to form a fluid-tight seal therebetween; and, a check valve member mounted for rotation with said plug member and having a tongue-like portion extending upwardly through said slot, a body portion located in said passage, and outwardly extending lug portions on said tongue-like portion resting on said upwardly facing surface, whereby said check valve member is pivotally located on said plug member, the arrangement and construction being such that said check valve member cooperates with said sealing means when said passage is aligned with said passageway to prevent flow through said valve in one direction while permitting flow therethrough in the opposite direction.

16. The combination valve of claim 15, wherein said sealing means includes:

an annular reinforcing member having an outer peripheral surface, an inner surface, and a surface conforming to the shape of said plug member;

a resilient member having a pressure responsive bead portion thereon encircling the peripheral surface of said reinforcing member; and, a second resilient member located in and encircling the surface of said reinforcing member conforming to the shape of said plug member.

17. The combination valve of claim 15, wherein said sealing means includes:

an annular reinforcing member having a surface thereon conforming to the shape of said plug member, and having an outer peripheral surface and an inner surface; and, resilient means encasing said reinforcing member except the inner surface thereon, said resilient means having a circumferential bead portion adjacent the outer peripheral surface and an annular bead portion adjacent the surface of said reinforcing member conforming to the shape of the plug member.

18. A combination valve including:

a valve body having a valve chamber therein and an inlet and an outlet therein communicating with opposite sides of the valve chamber, and an annular groove formed in the body within the chamber coaxially with said inlet;

a plug member rotatably mounted in the chamber and having a flow passage therethrough;

sealing means disposed in said annular groove encircling said inlet and adapted to cooperate with said plug member and valve body to form a fluid-tight seal therebetween; and, a check valve member mounted for rotation with said plug member and pivotally positioned on said plug member and extending into said flow passage, said check valve member being cooperable with said sealing means when said passage is aligned with said passageway to prevent flow through said valve in one direction while permitting flow therethrough in the opposite direction.

19. The combination valve of claim 18, wherein said sealing means includes:

an annular reinforcing member positioned in said annular groove;

a resilient member mounted in and encircling said annular reinforcing member in sealing engagement with said valve body; and, a second resilient member mounted in and encircling said annular reinforcing member and adapted to sealably engage said plug member.

References Cited

UNITED STATES PATENTS

| | | | |
|---|---|---|---|
| 713,331 | 11/1902 | McClelland | 137—614.17 X |
| 2,151,098 | 3/1939 | Greenwood | 137—269.5 |
| 2,399,300 | 4/1946 | Stewart et al. | 137—614.17 X |
| 3,061,267 | 10/1962 | Hamer | 251—317 |
| 3,123,367 | 3/1964 | Brummer et al. | 277—179 X |
| 3,146,792 | 9/1964 | Donnelly et al. | 251—315 X |

FOREIGN PATENTS

| | | |
|---|---|---|
| 1,122,789 | 1/1962 | Germany. |
| 557,671 | 2/1957 | Italy. |

WILLIAM F. O'DEA, Primary Examiner.

D. R. MATTHEWS, Assistant Examiner.